United States Patent
Pakhomov

(10) Patent No.: US 7,028,038 B1
(45) Date of Patent: Apr. 11, 2006

(54) METHOD FOR GENERATING TRAINING DATA FOR MEDICAL TEXT ABBREVIATION AND ACRONYM NORMALIZATION

(75) Inventor: Sergey V. S. Pakhomov, Minneapolis, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 41 days.

(21) Appl. No.: 10/613,261

(22) Filed: Jul. 3, 2003

Related U.S. Application Data

(60) Provisional application No. 60/393,907, filed on Jul. 3, 2002.

(51) Int. Cl.
*G06F 17/00* (2006.01)

(52) U.S. Cl. .......................... 707/100; 707/3; 704/275
(58) Field of Classification Search ................ 707/3, 707/4, 100; 705/2, 3; 704/275, 256, 256.3, 704/255; 717/109
See application file for complete search history.

(56) References Cited

U.S. PATENT DOCUMENTS

| | | | |
|---|---|---|---|
| 4,817,156 A | 3/1989 | Bahl et al. | |
| 4,831,550 A | 5/1989 | Katz | |
| 4,849,925 A | 7/1989 | Peckerar et al. | |
| 5,293,584 A | 3/1994 | Brown et al. | |
| 5,467,425 A | 11/1995 | Lau et al. | |
| 6,049,767 A | 4/2000 | Printz | |
| 6,055,494 A | 4/2000 | Friedman | |
| 6,182,029 B1 | 1/2001 | Friedman | |
| 6,535,849 B1 | 3/2003 | Pakhomov et al. | |
| 2002/0055919 A1 | 5/2002 | Mikheev | |
| 2002/0188421 A1 | 12/2002 | Tanigaki et al. | |
| 2003/0105638 A1* | 6/2003 | Taira | 704/275 |
| 2003/0120640 A1* | 6/2003 | Ohta et al. | 707/3 |
| 2003/0154208 A1* | 8/2003 | Maimon et al. | 707/100 |
| 2004/0044548 A1* | 3/2004 | Marshall et al. | 705/2 |
| 2004/0083452 A1* | 4/2004 | Minor et al. | 717/109 |

OTHER PUBLICATIONS

Black, *An Experiment in Computational Discrimination of English Word Senses*, IBM Journal of Research and Development, 32(2), pp. 185-194 (1988).

(Continued)

*Primary Examiner*—Sam Rimell
(74) *Attorney, Agent, or Firm*—Faegre & Benson LLP

(57) ABSTRACT

A method for electronically generating high-quality feature vectors that can be used in connection with electronic data processing systems implementing Maximum Entropy or other statistical models to accurately normalize abbreviations in text such as medical records. An abbreviation database and a training text database are provided. The abbreviation database includes abbreviation data representative of abbreviations and associated expansions to be normalized. The training text database includes a corpus of text having expansions of the abbreviations to be normalized. The corpus of text is processed as a function of the abbreviation data to identify the expansions in the corpus of text. Context information describing the context of the text in which the expansions were identified is generated. A set of feature vectors is also stored. Each feature vector including the context information generated for the associated expansion identified in the corpus of text.

10 Claims, 2 Drawing Sheets

OTHER PUBLICATIONS

Schütze, *Automatic Word Sense Discrimination,* Computational Linguistics, 24(1), pp. 97-123 (1998).

Hearst, *Noun Homograph Disambiguation Using Local Context In Large Text Corpora,* In Proc., 7th Annual Conference of the University of Waterloo Center for the New OED and Text Research, Oxford, pp. 1-15 (1991).

Yarowsky, *Unsupervised Word Sense Disambiguation Rivaling Supervised Methods,* In Proceedings of the Association for Computational Linguistics, pp. 189-196 (1995).

Open NLP Maxent—The Maximum Entropy Framework Internal Webpage printed Jun. 30, 2003, 10 pgs.

* cited by examiner

| ABBREVIATION | EXPANSION | $W_{L-1}$ | $W_{L+1}$ | SECTION ID |

METHOD FOR GENERATING TRAINING DATA FOR MEDICAL TEXT ABBREVIATION AND ACRONYM NORMALIZATION

REFERENCE TO RELATED APPLICATION

This application claims the benefit of U.S. Provisional Application Ser. No. 60/393,907, filed Jul. 3, 2002 and entitled Semi-Supervised Maximum Entropy Based Approach to Acronym and Abbreviation Normalization in Medical Texts, which is hereby incorporated by reference in its entirety.

FIELD OF THE INVENTION

The present invention relates generally to probabilistic modeling of text. In particular, the invention is a method for automatically generating training data that can be used in connection with Maximum Entropy or other probabilistic models for abbreviation and acronym normalization/disambiguation in medical or other kinds of text.

BACKGROUND OF THE INVENTION

The use of statistical or probabilistic methods such as Maximum Entropy and Markov Models to normalize or rationalize text during electronic document processing is generally known. Text normalization, the process of identifying variants and bringing them to a common (normalized) form, is an important aspect of successful information retrieval from medical documents such as health records, clinical notes, radiology reports and discharge summaries. In the medical domain, a significant part of the general problem of text normalization is abbreviation and acronym disambiguation. Throughout the remainder of this document, the word "abbreviation" is used to mean both "abbreviation" and "acronym" since the two words can be used interchangeably for the purposes of this document and invention. Numerous abbreviations are used routinely throughout such medical text and identifying their meaning is critical to understanding the document.

A problem is presented by the fact that abbreviations are highly ambiguous with respect to their meaning. The Unified Medical Language System (UMLS) is a database containing biomedical information and tools developed at the National Library of Medicine. Using the UMLS as an example, "RA" can have as meanings or stand for the expansions "rheumatoid arthritis," "renal artery," "right atrium," "right atrial," "refractory anemia," "radioactive," "right arm," "rheumatic arthritis" and other terms. It has been estimated that about 33% of the abbreviations in the UMLS are ambiguous. In addition to problems associated with text interpretation, abbreviations constitute a major source of errors in a system that automatically generates lexicons for medical natural language processing (NLP).

When processing documents to identify those that contain a specific term, it would be desirable to identify all the documents that also use an abbreviation for the specific term. For example, if searching for documents containing the term "rheumatoid arthritis," it would be desirable to retrieve all those documents that use the abbreviation "RA" in the sense of "rheumatoid arthritis." At the same time, it is desirable not to identify documents that use the same abbreviation, but with a sense different from that of "rheumatoid arthritis." Continuing with the above example, it would be desirable that the search not identify those documents where "RA" means "right atrial."

This abbreviation normalization is effectively a special case of word sense disambiguation (WSD). Approaches to WSD include supervised machine learning techniques, where some amount of training data is marked up by hand and used to train a classifier. One technique involves using a decision tree classifier. Black, *An Experiment in Computational Discrimination of English Word Senses*, IBM Journal of Research and Development, 32(2), pp. 185–194 (1988). Fully unsupervised learning methods such as clustering have also been successfully used. Shutze, *Automatic Word Sense Disambiguation, Computational Linguistics,* 24(1) (1998). A hybrid class of machine learning techniques for WSD relies on a small set of hand labeled data used to bootstrap a larger corpus of training data. Hearst, *Noun Homograph Disambiguation Using Local Context In Large Text Corpra*, In Proc., 7$^{th}$ Annual Conference of the University of Waterloo Center for the New OED and Text Research, Oxford (1991), Yarowski, *Unsupervised Word Sense Disambiguation Rivaling Supervised Methods*, In Proc., ACL-95, pp. 189–196 (1995).

One way to take context into account is to encode the type of discourse in which the abbreviation occurs. "Discourse" can, for example, be defined as the type of medical document and the medical specialty. As a more particular example, "RA" in a cardiology report can be normalized to "right atrial," while "RA" in a rheumatology note can be normalized to "rheumatoid arthritis." Unfortunately, this method of using the global context to resolve abbreviation ambiguity suffers from a number of drawbacks that limit its use in automatic document processing applications. First, it requires a database of abbreviations and their expansions linked with possible contexts in which particular expansions can be used. This is a labor intensive and error-prone task. Second, it requires a rule-based system for assigning correct expansions to their abbreviations. Any such system would likely become large and difficult to maintain. Third, the distinctions made between various expansions are likely to be coarse. For example, it may be possible to distinguish between "rheumatoid arthritis" and "right atrial," since the two terms likely appear in very separable contexts. However, distinguishing between "rheumatoid arthritis" and "right atrium" becomes more of a challenge and may require introducing additional rules that further complicate the system.

Maximum Entropy is statistical technique that has been used for Natural Language Processing. A useful aspect of this technique is that it allow the predefinition of characteristics of the objects being modeled. The modeling includes a set of training data known as feature vectors, which are predefined features or constraints that uniformly distribute the probability space between the candidates that do not conform to the constraints. Features are represented by indicator functions of the following kind.

$$F(o, c) = \begin{cases} 1, & \text{if } o = x \text{ and } c = y \\ 0, & \text{otherwise} \end{cases}$$

Where "o" stands for outcome and "c" stands for context. This function maps contexts and outcomes to a binary set. For example, to take a simplified part-of-speech tagging example, if y="the" and x="noun", then F(o,c)=1, where y is the word immediately preceding x. This means that in the context of "the" the next word is classified as a noun.

To find the maximum entropy distribution the Generalized Iterative Scaling (GIS) algorithm is used, which is a procedure for finding the maximum entropy distribution that conforms to the constraints imposed by the empirical distribution of the modeled properties in the training data.

There remains a need for an automated or at least semi-automated method (i.e., one that can be performed by an electronic data processing system) for generating training data used by statistical text normalization modeling systems. The method should be capable of generating training data that will enable the text normalization modeling systems to normalize the text to a relatively high degree of accuracy. A system of this type that can be used to normalize abbreviations and acronyms in medical text would be particularly useful.

SUMMARY OF THE INVENTION

The present invention is an automated data processing method for generating high-quality training data that can be used with statistical text normalization systems. One embodiment of the invention includes providing a corpus of text having expansions of the abbreviations to be normalized. Expansions in the corpus of text are identified. Context information describing the context of the text in which the expansions were identified is generated. Training data is then stored as a function of the context information. In other embodiments of the invention, the context information stored as the training data includes local context level information and discourse level information.

DETAILED DESCRIPTION OF THE PREFERRED EMBODIMENTS

The present invention is a method for operating a data processing system to automatically generate high-quality training data that is subsequently used in connection automated data processing text normalization systems. In particular, the training data is used in connection with Maximum Entropy or other statistical modeling techniques implemented in text processing and analysis systems. The preferred embodiment of the invention described herein generates Maximum Entropy training data in the form of feature vectors used to normalize abbreviations and acronyms found in medical text. Throughout the remainder of this specification, the term "abbreviation" is used to refer to abbreviations and/or acronyms.

Figures 1, 3:
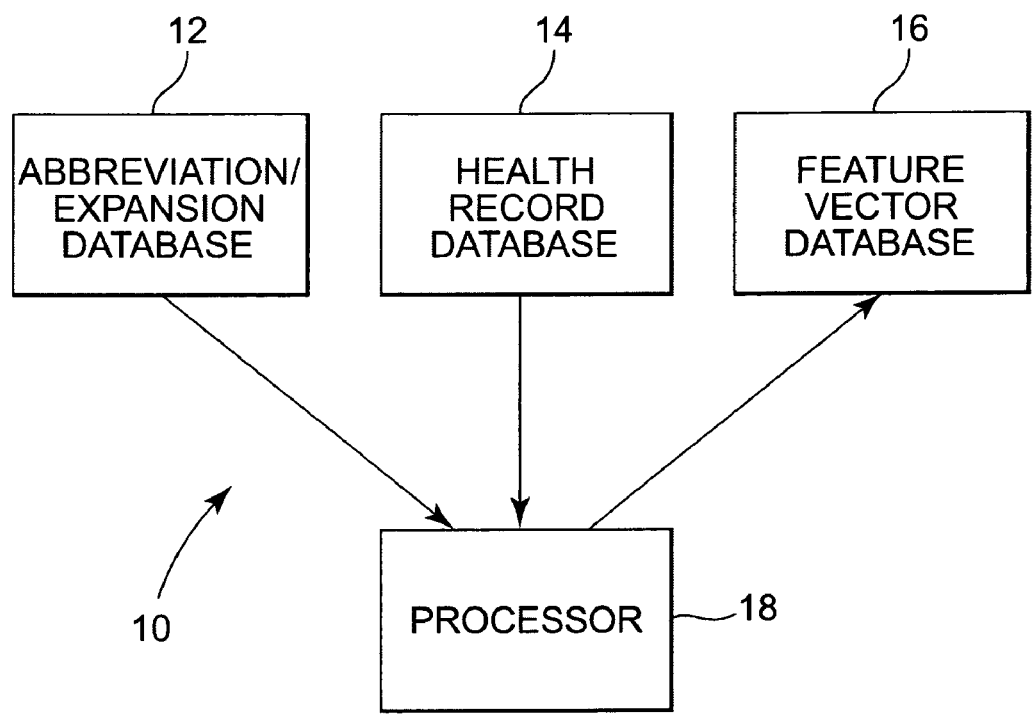
FIG. 1 is a functional block diagram of a data processing system that can be used to generate statistical model training data in accordance with the present invention.
FIG. 3 is an illustration of an example of the format of training data that can be generated in accordance with the method shown in FIG. 2.

FIG. 1 is a functional schematic illustration of a data processing system 10 that can be used in accordance with a preferred embodiment of the present invention to generate Maximum Entropy feature vectors. As shown, system 10 includes abbreviation/expansion database 12, health record database 14, feature vector database 16 and processor 18. Database 12 includes stored data in the form of a hash of expansions indexed by the associated abbreviations. System 10 generates sample vectors or feature vectors for one or more specific abbreviations to be normalized by the data processing system with which the training data is to be subsequently used. These feature vectors are also generated for each selected expansion or possible meaning of the abbreviation that it is desired to subsequently normalize. The training data need not be generated for all possible expansions of an abbreviation of interest. Accordingly, the hash in database 12 need only include the one or more abbreviations it is desired to normalize, and the associated expansions to which it is desired to normalize the abbreviations.

As described in greater detail below, the method implemented by system 10 use a corpus of clinical notes or other health records in which the expansions of the abbreviations to be trained for are found. Accordingly, health record database stores electronic versions of health records that have a reasonable likelihood of containing the expansions of interest. Health records of these types are typically divided or segmented into a number of sections, each of which may have a discourse marker. For example, clinical notes maintained by the Mayo Clinic in Rochester, Minn. include as subsections and associated markers Chief Complaint (CC), History of Present Illness (HPI), Impression/Report/Plan (IP) and Final Diagnoses (DX). Processor 18 processes the documents present in health record database 14 to generate the feature vectors for the abbreviation and expansions stored in database 16. The feature vectors generated in this manner are then stored in database 16.

Figure 2:
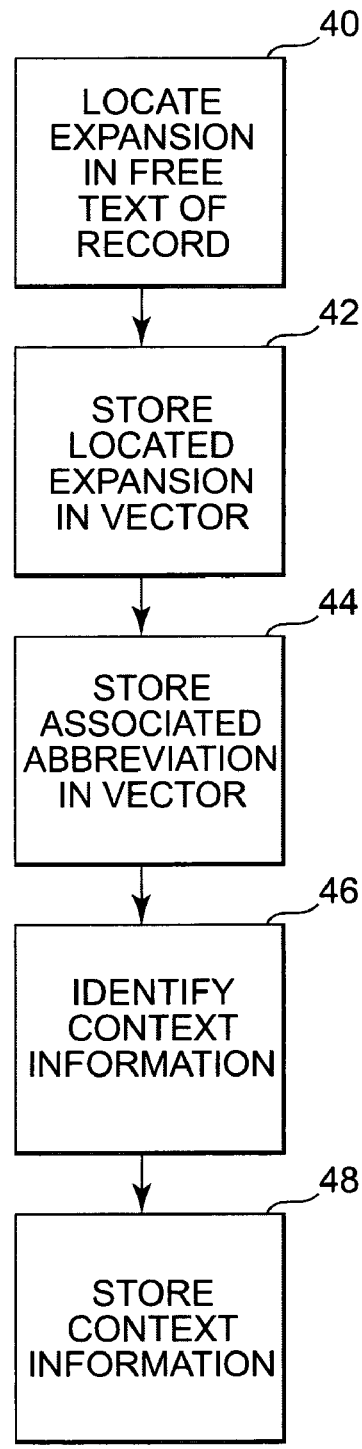
FIG. 2 is a flowchart of a method implemented by the processor shown in FIG. 1 to generate training data in accordance with the present invention.

FIG. 2 is a flowchart illustrating the processing method performed by processor 18 to generate the feature vectors. The method generates feature vectors that describe the context in which the expansions occur in the medical records. In the embodiment described herein, the context of each feature vector is described as a function of surrounding lexical terms (i.e., local context), and the sections of the health record in which the expansions are present (i.e., a discourse type). Since the abbreviation for a given expression will typically occur in the same context as the expression itself, a feature vector generated on the basis of the context of the expression will enable the abbreviation to be accurately normalized. Although the embodiment of the method described herein uses the surrounding terms and section of the health record to characterize the context of the expansions in the feature vectors, it is to be understood that there are a wide variety of other and/or additional approaches for defining context. Furthermore, additional levels of detail can be used to characterize the context in a function of surrounding terms and health record sections. For example, discourse characterizations could be expanded to include the type of medical service associated with the record (e.g., cardiology, rheumatology and endocrinology). In the non-medical area the field could be considered (e.g., legal, banking and accounting). Local context can also be described in terms of a larger window of surrounding terminology than is used in the example below (e.g., more words surrounding the expansion, and words in sentences on either side of the sentence including the expansion).

Referring back to FIG. 2, the method begins by processing the health records to locate the desired expansions as shown at step 40. In one embodiment of the invention, step 40 is performed by filtering the health record through a dynamic sliding window buffer having a maximum window size set to the maximum length of any desired expansion. Each time a match to such an expansion is found, a feature vector describing the expansion and its context in the health record is created and stored in database 16. This process includes storing the expansion itself and its associated abbreviation as indicated by steps 42 and 44. The associated context information is also generated and stored as indicated by steps 46 and 48. In one embodiment of the invention the feature vector includes as local context information the word immediately preceding the located expansion ($w_{i-1}$) and the word immediately following the located expansion ($w_{i+1}$). As discourse context information, this embodiment of the invention identifies and stores the section identifier (ID) of the health record in which the expansion was located. FIG. 3 is an illustration of an exemplary format for such a feature vector. Steps 40, 42, 44, 46 and 48 are repeated for each desired health record in database 14. A file of one or more, and typically many feature vectors are thereby generated for each abbreviation and expansion set.

The feature vectors in database 16 can then be used in a known or otherwise conventional manner by a data processing system (not shown) that makes use of a Maximum Entropy model for normalizing abbreviations and acronyms in medical text. Tests of the invention described below were conducted on a Maximum Entropy implementation similar to that described in the Ratnaparkhi paper and developed as part or the open source Maxent 1.2.4 package. Ratnaparkhi, *Maximum Entropy Part of Speech Tagger*, Proceedings of the Conference on Empirical Methods in Natural Language Processing, University of Pennsylvania, (May, 1996). http:// maxent.sourceforge.net. In the Maxent implementation, features are reduced to contextual predicates. For example, one such contextual predicate could be the type of discourse that an outcome occurs in. The Context Generator class of the Maxent package was modified to allow for the features described herein.

Use of the feature vectors in this manner effectively assumes that given an abbreviation and one of it's expansions, the two will likely have a similar distribution. For example, if the term "rheumatoid arthritis" is encountered, it is likely that the context surrounding the use of this term is similar to the context surrounding the abbreviation "RA" when it is used to refer to rheumatoid arthritis. Experiments conducted to test this hypothesis demonstrate a high degree of correlation in the distribution of abbreviations compared to the distribution of their expansions.

The experiment was conducted by processing a corpus of approximately 171,000 rheumatology notes. Immediate contexts composed of words in positions $\{w_{i-1}, w_{i-2}, w_{i+1}, w_{i+2}\}$ for one unambiguous abbreviation—DJD (degenerative joint disease) were recorded. Here $w_i$ is either the abbreviation "DJD" or it's multi-word expansion "degenerative joint disease." Since this abbreviation has only one possible expansion, we can rely entirely on finding the strings "DJD" and "degenerative joint disease" in the corpus without having to disambiguate the abbreviation by hand in each instance. For each instance of the strings "DJD" and "degenerative joint disease," the frequency with which the words (tokens) in positions $w_{i-1}, w_{i-2}, w_{i+1}$, and $w_{i+2}$ occur with that string as well as the number of unique strings (types) in these positions were recorded.

The result was that "DJD" occurred 2906 times, and "degenerative joint disease" occurred 2517 times. Of the 2906 occurrences of "DJD," there were 204 types that appeared immediately prior to mention of DJD ($w_{i-1}$ position) and 115 types that occurred immediately after ($w_{i+1}$ position). Of the 2517 occurrences of "degenerative joint disease", there were 207 types that occurred immediately prior to mention of the expansion ($w_{i-1}$ position) and 141 words that occurred immediately after ($w_{i+1}$ position). The overlap between "DJD" and its expansion is 115 types in $w_{i-1}$ position and 66 types in $w_{i+1}$ position. Table 1 summarizes the results for all four $\{w_{i-1}, w_{i-2}, w_{i+1}, w_{i+2}\}$ positions.

TABLE 1

"DJD" vs. "degenerative joint disease" distribution comparison

| Context | Context overlap | N of unique contexts | Context similarity (%) |
|---|---|---|---|
| $W_{i-1}$ | | | |
| DJD | 115 | 204 | 56 |
| degen. joint dis. | 115 | 207 | 55 |
| Mean | | | 55.5 |
| $W_{i+1}$ | | | |
| DJD | 66 | 115 | 50 |
| degen. joint. dis. | 66 | 141 | 46 |
| Mean | | | 48 |
| $W_{i-2}$ | | | |
| DJD | 189 | 371 | 50 |
| degen. joint dis. | 189 | 410 | 46 |
| Mean | | | 48 |
| $W_{i+2}$ | | | |
| DJD | 126 | 245 | 51 |
| degen. joint dis. | 126 | 301 | 41 |
| Mean | | | 46 |
| Total | | | 49.37 |

On average, the overlap between the contexts in which "DJD" and "degenerative joint disease" occur is around 50%, which is a considerable number because this overlap covers on average 91% of all occurrences in $w_{i-1}$ and $w_{i+1}$ as well as $w_{i-2}$ and $w_{i+2}$ positions.

For purposes of testing the accuracy of normalization conducted using feature vectors generated in accordance with the present invention, two kinds of models were trained for each data set: local context models (LCM) and combo (CM) models. The former were built by training on the sentence-level context only, defined as two preceding ($w_{i-1}$, $w_{i-2}$) and two following ($w_{i+1}$, $w_{i+2}$) words surrounding an abbreviation expansion. The latter kind is a model trained on a combination of sentence and section level contexts defined simply as the heading of the section in which an abbreviation expansion was found.

For purposes of the test, it was considered whether it would be better to build a large set of small ME models trained on sub-corpora containing context for each abbreviation of interest separately, or if it would be more beneficial to train one model on a single corpus with contexts for multiple abbreviations. This was motivated by the idea that ME models trained on corpora focused on a single abbreviation may perform more accurately, even though such an approach may be computationally expensive.

TABLE 2

A comparison between UMLS expansions for 6 abbreviations and the expansions actually found in the training data.

| ABBR | N OF UMLS EXPANSIONS | N OF OBSERVED EXPANSIONS |
|---|---|---|
| NR | 23 | 10 |
| PA | 72 | 15 |
| PN | 28 | 11 |
| BD | 30 | 3 |
| INF | 13 | 7 |
| RA | 28 | 8 |
| Mean | 32.33 | 9 |

Two sets of data were generated for the test. The first set (Set A) is composed of training and testing data for six abbreviations (NR, PA, PN, BD, INF, RA) where each training/testing subset contains only one abbreviation per corpus, resulting in six subsets. Not all of the possible expansions found in the UMLS for a given abbreviation will be found in the text of the clinical notes. Table 2 shows the number of expansions actually found in the rheumatology training data for each of the six abbreviations used for the test as well as the expansions found for a given abbreviation in the UMLS database. The UMLS database has on average three times more variability in possible expansions that were actually found in the given set of training data. This is not surprising because the training data was derived from a relatively small subset of 10,000 notes.

The other set (Set B) is similar to the first corpus of training events. However, it is not limited to just one abbreviation sample per corpus. Instead, it is compiled of training samples containing expansions from sixty-nine abbreviations. The abbreviations to include in the training/testing were selected based on the following criteria: 1) at least two expansions; and 2) they have 100–1000 training data samples.

The data compiled for each set and subset was split at random in the 80/20 fashion into training and testing data. The two types of ME models (LCM and CM) were trained for each subset on one hundred iterations through the data with no cutoff (all training samples used in training).

The study was designed to address several questions. One was whether local sentence-level context can be used successfully to disambiguate abbreviation expansion. Another question that arose from the structure of the data used for this study is whether more global section-level context indicated by section headings such as "chief complaint", "history of present illness", etc., would have an effect on the accuracy of predicting the abbreviation expansion. A third question is whether it is more beneficial to construct multiple ME models limited to a single abbreviation. Accordingly, four sets of tests were conducted: 1) Local Context Model and Set A, 2) Combo Model and Set A, 3) Local Context Model and Set B, 4) Combo Model and Set B.

Table 3 summarizes the results of training Local Context models with the data from Set A (one abbreviation per corpus).

TABLE 3

Local Context Model and Set A Results

| ABBR | Acc. (%) | Test Event | Train Event | Out. | Predic. |
|---|---|---|---|---|---|
| NR | 87.87 | 139.6 | 495.7 | 10.8 | 580.4 |
| PN | 77.05 | 166.2 | 612.7 | 11 | 722.5 |
| BD | 98.49 | 174.4 | 724.6 | 3 | 704.8 |
| PA | 86.45 | 182.8 | 653.3 | 13.9 | 707.1 |
| LNF | 87.33 | 196.2 | 819.3 | 6.9 | 950.3 |
| RA | 97.67 | 924.6 | 253.5 | 7.6 | 1549.4 |
| Mean | 89.14 | 297.3 | 973.43 | 8.87 | 869.08 |

The results in Table 3 show that, on average, after a ten-fold cross-validation test, the expansions for the given six abbreviations have been predicted correctly 89.14%.

TABLE 4

Combo Model and Set A results

| ABBR | Acc. (%) | Test Event | Train Event | Out. | Predic. |
|---|---|---|---|---|---|
| NR | 89.515 | 139.6 | 504.6 | 10.8 | 589.4 |
| PN | 78.739 | 166.2 | 618.7 | 11 | 746.1 |
| BD | 98.39 | 174.4 | 736.6 | 3 | 713.8 |
| PA | 86.193 | 182.8 | 692.2 | 13.9 | 717 |
| INF | 87.409 | 196.2 | 842.3 | 7 | 959.8 |
| RA | 97.693 | 924.6 | 270.4 | 7.6 | 1559.4 |
| Mean | 89.66 | 297.5 | 2026.4 | 8.88 | 890.92 |

Table 3 as well as Table 4 display the accuracy, the number of training and testing events/samples, the number of outcomes (possible expansions for a given abbreviation) and the number of contextual predicates averaged across ten iterations of the cross-validation test.

Table 4 presents the results of the Combo approach with the data also from Set A. The result of the combined discourse+local context approach are only slightly better than those of the sentence-level only approach.

Table 5 displays the results for the set of tests performed on data containing multiple abbreviations—Set B but contrasts the Local Context Model with the Combo Model.

TABLE 5

Local Context Model performance contrasted to Combo model performance on Set B

| | Acc. (%) | Test Event | Train Event | Out. | Predic. |
|---|---|---|---|---|---|
| LCM | 89.169 | ~4791 | ~21999 | ~250 | ~9400 |
| CM | 89.015 | ~4792 | ~22000 | ~251 | ~9401 |

The first row shows that LCM model performs with 89.17% accuracy. CM's result is very close: 89.01%. Just as with Tables 3 and 4, the statistics reported in Table 5 are averaged across 10 iterations of cross-validation. The results of this study indicate that using Maximum Entropy modeling for abbreviation disambiguation is a sound approach for text normalization tasks involving abbreviations. Several observations can be made about the results of this study. First of all, the accuracy results on the small pilot sample of 6 abbreviations as well as the larger sample with 69 abbreviations are quite encouraging in light of the fact that the training of the ME models is largely unsupervised.

Although the present invention has been described with reference to preferred embodiments, those skilled in the art will recognize that changes can be made in form and detail without departing from the spirit and scope of the invention.

What is claimed is:

1. A method for generating training data that can be used with statistical models to normalize abbreviations in text, including:
    providing a corpus of text including expansions of the abbreviations to be normalized;
    processing the corpus of text to identify the expansions in the corpus of text;
    processing the corpus of text to generate context information describing the context of the text in which the expansions were identified; and
    storing training data as a function of the generated context information, the stored training data including a set of feature vectors where each feature vector includes the abbreviation, associated expansion and the context information generated for the associated expansion identified in the corpus of text.

2. The method of claim 1 wherein:
generating context information includes generating local context information; and
storing training data includes storing local context data as training data.

3. The method of claim 2 wherein the local context information and local context training data includes sentence level information.

4. The method of claim 3 wherein the sentence level information includes words in a sentence in which the identified expansion is located.

5. The method of claim 1 wherein:
generating context information includes generating discourse context information; and
storing training data includes storing discourse context data as training data.

6. The method of claim 5 wherein the discourse context information and discourse context training data include text section level information.

7. The method of claim 1 wherein:
generating context information includes generating local context information and discourse context information; and
storing training data includes storing local context data and discourse data as training data.

8. The method of claim 1 and further including processing text using a Maximum Entropy model and the stored feature vectors to normalize abbreviations in the text.

9. The method of claim 1 and further including processing text using a statistical model and the stored training data to normalize abbreviations in the text.

10. The method of claim 1 wherein:
the method further includes providing stored abbreviation data representative of abbreviations and associated expansions for which training data is to be generated; and
processing the text to identify the expansions includes processing the corpus of text as a function of the stored abbreviation data.

* * * * *